United States Patent [19]
Otsubo

[11] Patent Number: 5,202,866
[45] Date of Patent: Apr. 13, 1993

[54] DIGITAL AUDIO DISK PLAYER

[75] Inventor: Hiroshi Otsubo, Tokorozawa, Japan

[73] Assignee: Pioneer Electronic Corporation, Tokyo, Japan

[21] Appl. No.: 668,139

[22] Filed: Mar. 11, 1991

[30] Foreign Application Priority Data

Jun. 8, 1990 [JP] Japan .................................. 2-150184

[51] Int. Cl.$^5$ .............................................. G11B 7/00
[52] U.S. Cl. ....................................... 369/32; 369/58; 369/50
[58] Field of Search ..................... 369/32, 33, 47, 50, 369/53, 54, 58, 134; 358/342; 360/5, 6, 15, 44.34, 44.36

[56] References Cited

U.S. PATENT DOCUMENTS 5,008,872  4/1991  Tomoda et al. ...................... 369/32

*Primary Examiner*—Andrew L. Sniezek
*Assistant Examiner*—Nabil Hindi
*Attorney, Agent, or Firm*—Keck, Mahin & Cate

[57] ABSTRACT

A digital audio disk player detects a peak position indicating a peak value of the recorded level over N pieces of music selected to be played alone or in sequence from multiple pieces of music recorded on a digital audio disk, and plays a predetermined interval including the peak position. The player can therefore set the optimal recording level at the time of dubbing programmed pieces of music or those music pieces which are edited by the editing function.

10 Claims, 3 Drawing Sheets

DIGITAL AUDIO DISK PLAYER

BACKGROUND OF THE INVENTION

1. Field of the Invention

The present invention relates to a player for a digital audio disk.

2. Description of the Related Art

In dubbing a digital audio disk (hereafter simply referred to as "disk") or a so-called CD (Compact Disk) onto a magnetic tape, it is necessary to set the recording level depending on, for example, the type of the magnetic tape. Conventionally, before the recording level is set, a so-called peak search is executed. This is a process to play all the pieces of music on the disk to detect a peak value and to compare the detected peak level with a reference level thereby to determine a recording level for the magnetic tape. This technique is, for example, disclosed by a Japanese UM Laid-Open No. 62-175429.

The peak search is sufficient when all the pieces of music on the disk are to be recorded on the magnetic tape while being played. To dub music piece by piece, however, the user should set the recording level matching the peak level of every piece of music. Some disk players are equipped with an edit function that permits the players to select those pieces of music to be dubbed which will fit the length of the magnetic tape in use. Such an edit function is disclosed in Japanese Patent Laid-Open No. 62-204488. If there is a peak level for the disk in other piece of music than selected to be edited, setting of the recording level will be based on the peak level of that music piece which has not been selected for the dubbing purpose. In programming pieces of music to be dubbed, the same problem would arise when the peak level is present in other music piece than designated by the program.

SUMMARY OF THE INVENTION

It is therefore an object of the present invention to provide a digital audio disk player which can detect a peak position over all the pieces of music specified by a user for program selection, or automatically specified at the time of using an edit function, and which can play music around the detected peak position.

A player for digital audio disk having multiple pieces of music recorded thereon according to the present invention, comprises a detection means for detecting a record position where information indicating a peak value of a reproduction level in to-be-played N pieces of music (N: an integer equal to or greater than one) among the multiple pieces of music is recorded; and a control means for effecting such control as to play a predetermined interval including the record position.

With this arrangement, this disk player detects a peak position over N pieces of music selected to be played alone or in sequence from multiple pieces of music recorded on a digital audio disk, and plays a predetermined interval including the peak position.

DETAILED DESCRIPTION OF THE PREFERRED EMBODIMENT

A preferred embodiment of the present invention will now be described in detail referring to the accompanying drawings.

Figure 1:
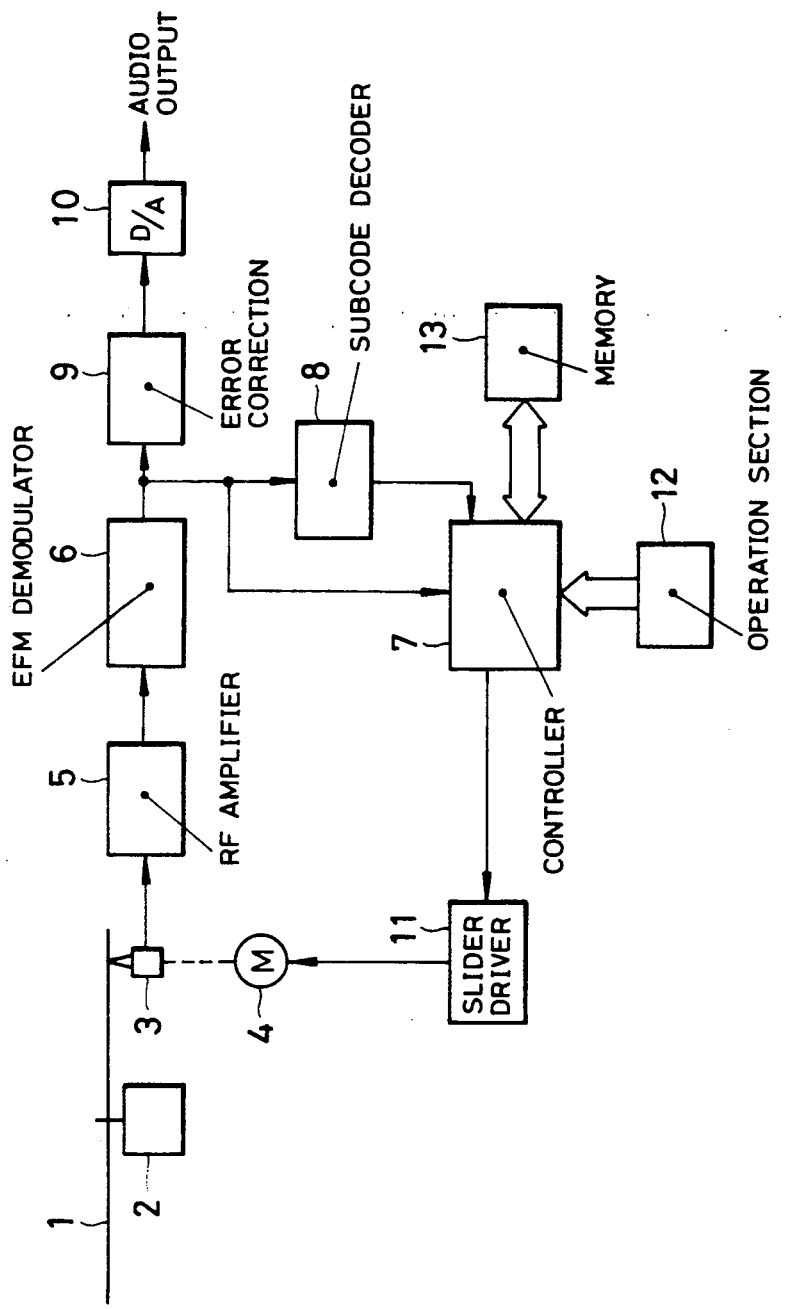
FIG. 1 is a block diagram showing one embodiment of the present invention.

Referring to FIG. 1, a disk 1 is rotated by a spindle motor 2, and information recorded on the disk 1 is read out by an optical pickup 3. The pickup 3 is mounted on a slider (not shown) which is driven by a slider motor 4 in the radial direction of the disk 1. If the CD format is used for signals on the disk 1, the output signal of the pickup 3 is an EFM (Eight to Fourteen Modulation) signal. The read EFM signal is EFM-demodulated by an EFM demodulator 6 through an RF amplifier 5. The resultant signal is supplied to a controller 7 and a subcode decoder 8 while it is subjected to error correction by an error correction circuit 9. The corrected signal is converted by a D/A converter 10 into an analog signal, which is in turn output as a reproduction audio signal. The subcode decoder 8 decodes subcode information recorded frame by frame, i.e., code information, such as the track (music) numbers, indexes, time and frame number of each music piece, and absolute time and frame number on the disk. The decoded data is sent to the controller 7.

The controller 7, constituted by a microcomputer, performs the general control of the player. This control includes positional control of the pickup 3 in the radial direction of the disk by driving the slider motor 4 through a slider driver 11, detection of the peak value of the reproduction level for each piece of music when a peak search command is issued from an operation section 12, and control to store the detected peak value and address data representing the peak position acquired from the decoded output of the subcode decoder 8, in association with each other, as a data table for each music piece in a memory 13. The memory 13 is provided with a table for saving the peak value of the reproduction level over the entire pieces of music and the peak position address, and n tables for respectively saving the peak values of the reproduction level of the individual (n) pieces of music recorded and their peak position addresses. The memory further has a valid flag for each piece of music which represents that the peak value and peak position address of that music piece have already been saved.

There are two kinds of peak search commands: a peak search to search for the peak value of the reproduction level for a single designated piece (hereafter referred to as "single-piece peak search"), and a peak search to search for the peak value of the reproduction level for multiple pieces of music (hereafter referred to as "multiple-piece peak search"). The multiple-piece peak search is classified into a peak search over all the pieces of music on the disk and a peak search for a group of pieces of music to be played by programming or editing. Both peak searches are selectively designated by the user making a key input through the operation section 12.

Figure 2:
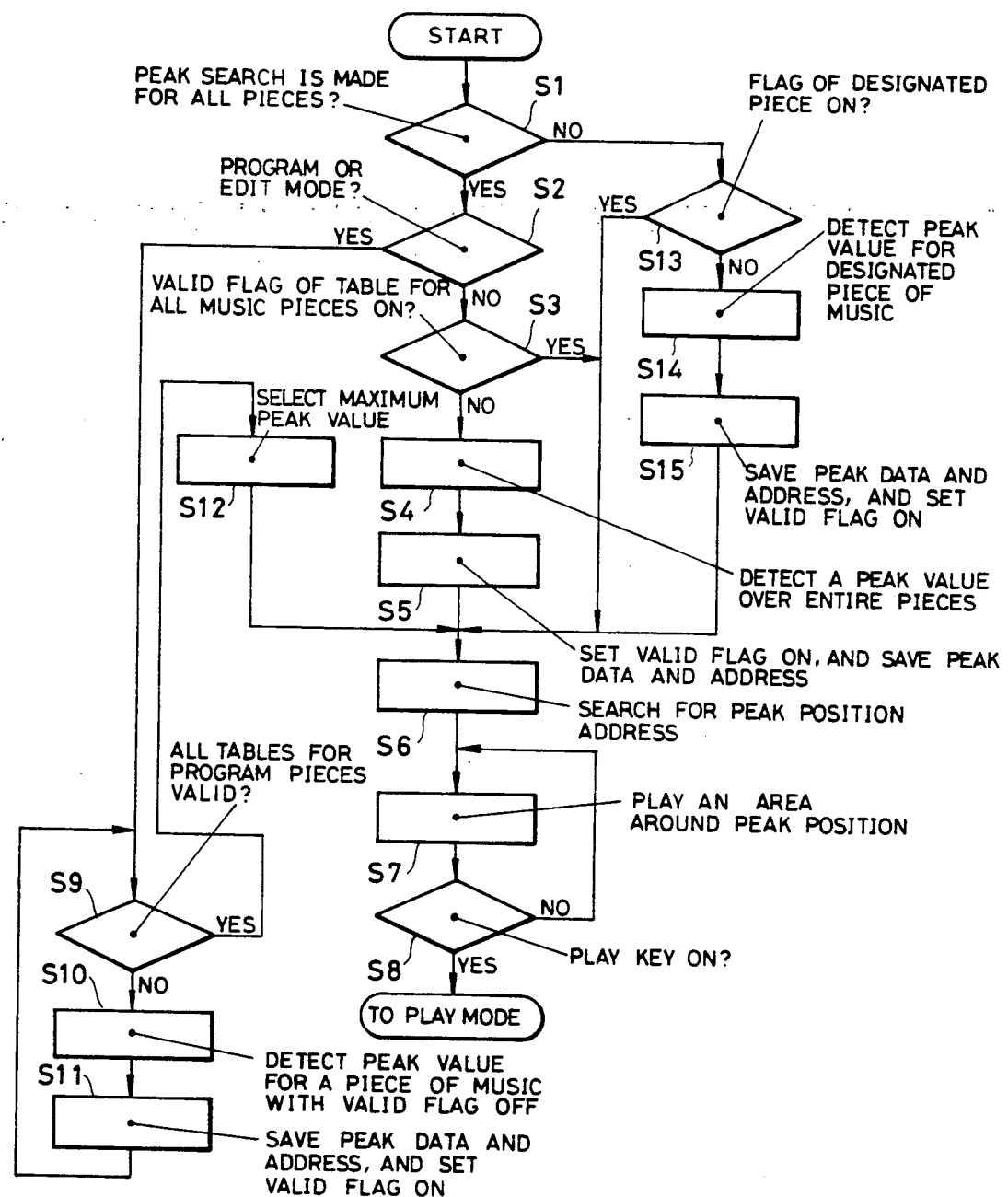
FIG. 2 is a flowchart illustrating a sequence of processes carried out in peak search mode.

A sequence of processes for the peak search that the processor of the controller 7 executes will now be explained referring to the flowchart in FIG. 2.

The processor first determines whether or not the multiple-piece peak search is designated (step S1). When the multiple-piece peak search has been designated, the processor determines if the program mode or the edit mode is specified (step S2). When neither mode is designated, the processor then determined if the valid flag of that table which holds the peak value over all the pieces of music and its peak position address, is set ON (step S3). When the valid flag is not set ON, the processor detects the peak value of the reproduction level over all the pieces of music by fast-forwarding the pickup 3 through, for example, repetitive jumping and playing (step S4). Then the processor sets the valid flag ON, and stores peak data of the peak value and peak position address (absolute time on the disk) for that flag (step S5). Subsequently, the processor searches for the peak position address stored in step S5 (step S6), and then plays a predetermined interval which includes the peak position (step S7). The processor repeats playing the predetermined interval until it decides that a key-input has been made by the operation of a PLAY key of the operation section 12 (step S8). When there is the key-input from the PLAY key, the processor moves to an operation to play the music from the first piece of music. When it is judged in step S3 that the valid flag is set ON, the flow advances directly to step S6. Specific process sequences for detecting the peak value of the reproduction level over the entire pieces of music (step S4) and for saving peak value data and the peak position address (step S5) will be described later.

When it is judged in step S2 that either the program mode or the edit mode is designated, the processor determined if the valid flags of the tables in programmed (or edited) pieces of music are all set ON (step S9). If there is any piece of music whose flag is OFF, the processor detects the peak value of the reproduction level of that music piece (step S10). Subsequently, the processor saves the peak data of the peak value and the peak position address in the associated table and sets the valid flag of that table ON (step S11). When judging in step S9 that all the valid flags are ON, the processor selects the maximum value among the peak data of the individual tables (step S12), then moves to step S6 to search for the peak position address of the maximum value. Since either the program mode or edit mode has been designated, the player starts playing the music from the first piece in the programmed order or in the edited order by the operation of the PLAY key.

When it is not judged in step S1 that the multiple-piece peak search has been designated, it means that the single-piece peak search has been designed. The processor then determines if the valid flag for the designated piece of music is set ON (step S13). When the valid flag is not set ON, the processor detects the peak value of the reproduction level of the designated music piece (step S14). Then, the processor saves the peak data of the peak value and the peak position address in the associated table and sets the valid flag of the peak value ON (step S15). The flow moves to step S6 to search for the peak position address. If the valid flag is judged to have been set ON in step S13, the flow directly advances to step S6. As the single-piece peak search has been designated, the player starts playing the designated piece of music from the beginning when the PLAY key is operated.

Figure 3:
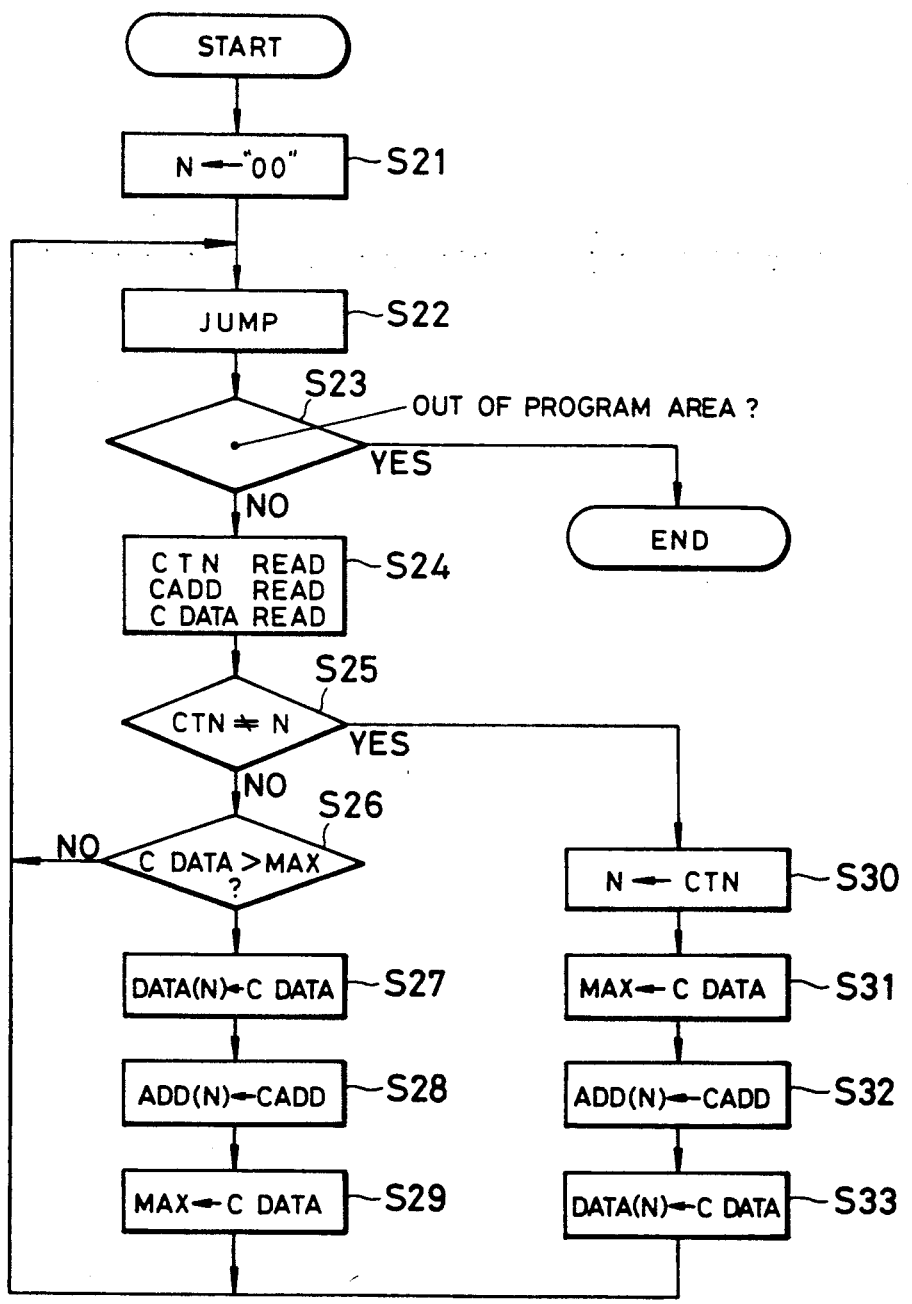
FIG. 3 is a flowchart depicting a sequence of processes executed to detect the peak value of the reproduction level over the whole pieces of music, and to save its peak data as well as peak position address.

Processes for detecting the peak value of the reproduction level over all the pieces of music and those for saving the peak data of the peak value and the peak position address will now be described referring to the flowchart in FIG. 3. In this routine, when the peak value over the entire music pieces is detected, the peak value for every piece of music will be detected at the same time.

The processor first resets a track number N to be temporarily stored to "00" (step S21), and executes a jump operation to allow the beam spot of the pickup 3 to jump by a predetermined number of tracks (step S22). Then the processor determines whether or not the beam spot has jumped out of the program area (step S23). When the spot is out of the program area, the process of this subroutine will be terminated.

When the beam spot is in the program area, the processor reads a current track number CTN to which the spot has jumped and a current address CADD (absolute time on the disk) from the decoded output of the sub-code decoder 8, and also reads current data CDATA from the demodulated output of the EFM demodulator 6 (step S24). Next, the processor determines if the current track number CTN has changed, i.e., if CTN≠N (step S25). When CTN=N, the processor determines whether or not the current data CDATA is greater than data MAX to be temporarily stored, which is the latest maximum value (step S26). When CDATA≦MAX, the processor returns to step S22. When CDATA>MAX, the processor saves the current data CDATA as peak data DATA(N) in the table associated with the track number N (step S27), and saves the current address CADD as a peak position address ADD(N) in that table (step S28). Further, as the current data CDATA is the latest maximum value, it is saved as the data MAX (step S29). Then the flow returns to step S22.

When the processor judges in step S25 that CTN≠N, i.e., that the track number CTN has changed, it sets the altered track number CTN as the track number N (step S30). As the current data CDATA is the latest maximum value, it is saved as the data MAX (step S31). Then, the current address CADD is saved as the peak position address ADD(N) in the table associated with the track number N (step S32). Subsequently, the current data CDATA is saved as peak data DATA(N) in that table (step S33); the flow then returns to step S22.

According to the above sequence of the processes, the peak data for each piece of music is detected at the same time as the detection of the peak data over the entire music pieces. The detected peak data for every music piece is stored together with peak position address in the associated table. Although the above embodiment has been described with reference to the case of detecting peak data and its peak position address when the peak search is designated, it is also possible to always detect the peak data and peak position address for each piece of music in the normal play mode. At this time, when the music is not played to the end, the peak data acquired by that point of time may not be correct peak data due to the possibility that the peak data of the reproduction level lies in part following where interrupted. When a scan key, skip key or stop key is operated during playing of a piece of music, the peak data of that music piece should be treated as unjudged. In other words, the valid flag is set ON only for that piece of music which has been played from the beginning to the end.

When the peak data for all the pieces of music are stored in the tables, the peak position address of the maximum value among the peak data is treated as the peak position address over the entire pieces of music and the valid flag is set ON accordingly.

There are some ways of discriminating peak data over the entire pieces of music. For instance, data acquired during playing is always compared with data on the memory and is sequentially updated when the former data is greater than the latter, and the valid flag is set ON when playing all the pieces of music is completed. As another method, when all the valid flags are set ON for the peak data of the individual pieces of music, the maximum value among the peak data is selected and stored in the memory.

As described above, the digital audio disk player according to the present invention detects a peak position over N pieces of music selected to be played alone or in sequence from multiple pieces of music recorded on a digital audio disk, and plays a predetermined interval including the peak position. This arrangement makes it possible to set the optimal recording level at the time of dubbing programmed pieces of music or those music pieces which are edited by the editing function.

What is claimed is:

1. A method for detecting the peak levels of music recorded on a digital audio disk having a plurality of music pieces recorded thereon, the method comprising the steps of:
   reading the digital audio disk for playback of each of selected music pieces recorded thereon;
   producing an output signal from data read from said audio disk;
   detecting a level of said output signal as each music piece is read from the audio disk;
   determining a peak level of said output signal for each of said music pieces;
   determining the address of each peak level for each of said music pieces; and
   storing each peak value and the address for each peak value associated therewith for each of said music pieces.

2. The method of claim 1, and further comprising the step of comprising the peak value for each of said music pieces for determining the overall peak value for all of the music pieces.

3. The method of claim 1, and further comprising the step of issuing a flag for each peak value of each music piece as it is detected, the flag indicating that a peak value for the corresponding music piece has been determined.

4. A method for detecting the peak levels of music recorded on a digital audio disk having a plurality of music pieces recorded thereon, the method comprising the steps of:
   designating a particular one of said music pieces for peak level detection;
   moving a pick-up to a position on said digital audio disk corresponding to the beginning of said particular music piece;
   reading on said digital audio disk from said position corresponding to the beginning of said particular music piece;
   producing an output signal from data read from the digital audio disk;
   detecting a level of said output signal;
   determining a peak level of said peak signal for said particular music piece; and
   storing the peak level and the address of said peak level for said particular music piece.

5. The method of claim 4, and further comprising the step of issuing a flag for said peak level indicating that a peak level for said particular music piece has been determined.

6. A player for a digital audio disk have multiple music pieces recorded thereon, the player comprising:
   means for reading the digital audio disk for playback of each of the music pieces recorded thereon;
   means for producing an output signal from data read from said audio disk;
   means for detecting a level of said output signal as each music piece is read from the audio disk;
   means for determining a peak level of said output signal for each of said music pieces;
   means for determining the address of each peak level for each of said music pieces; and
   means for storing each peak value and the address for each peak value associated therewith for each of said music pieces.

7. The disk player of claim 6, and further comprising means for comparing the stored peak values for each of said music pieces for determining the maximum peak value of all of the music pieces.

8. The disk player of claim 6, and further comprising means for issuing a flag for each peak value of each music piece as it is detected, the flag indicating that a peak value for the corresponding music piece has been determined.

9. A player for a digital audio disk having a plurality of music pieces recorded thereon, comprising:
   detection means for detecting a peak position and a peak value where the recorded signal indicates a peak value of a reproduction level within each of several ones of said music pieces; and
   memory means having a plurality of memory areas for respectively storing the peak positions and the peak values detected by said detection means.

10. A player for a digital audio disk having a plurality of music pieces recorded thereon, comprising:
    detection means for detecting a peak position and a peak value where the recorded signal indicates a peak value of a reproduction level within each of several ones of said music pieces;
    memory means having a plurality of memory areas for respectively storing the peak positions and the peak values detected by said detection means;
    selecting means for selecting at least one music piece to the played; and
    controlling means for controlling said detection means so that said detection means detects said peak position and said peak values of one or more music pieces selected by said selecting means when said peak position and said peak value of the selected music pieces are not stored in said memory means.

* * * * *